United States Patent [19]

Larkin

[11] Patent Number: 4,602,062
[45] Date of Patent: Jul. 22, 1986

[54] CONVERSION OF POLYVINYL ALCOHOL TO ACRYLIC ACID POLYMER

[75] Inventor: John M. Larkin, Austin, Tex.

[73] Assignee: Texaco Inc., White Plains, N.Y.

[21] Appl. No.: 685,931

[22] Filed: Dec. 24, 1984

[51] Int. Cl.$^4$ .............................................. C08F 8/00
[52] U.S. Cl. ..................................... 525/61; 526/317.1
[58] Field of Search ........................................... 525/61

[56] References Cited

U.S. PATENT DOCUMENTS 2,649,435  8/1953  Stanin et al. ........................... 525/61
3,365,408  1/1968  Ohara ..................................... 525/61

Primary Examiner—Harold D. Anderson
Attorney, Agent, or Firm—Jack H. Park; Kenneth R. Priem

[57] ABSTRACT

It has been surprisingly discovered in accordance with the present invention that polyvinyl alcohol can be substantially selectively converted to an acrylic acid polymer or copolymer by first reacting the polyvinyl alcohol with a desired predetermined amount of formic acid to form an intermediate reaction product of the formic acid with the hydroxyl groups of the polyvinyl alcohol and by bringing the intermediate into contact with a bed of activated carbon in the presence of carbon monoxide and an alkyl halide promoted group VIII soluble transition metal catalyst, optionally in the presence of a solvent. When substantially all of the hydroxyl groups are reacted with formic acid to form a polyvinyl formate intermediate, the final product will be a polyacrylic acid. When the intermediate contains both hydroxyl groups and formate groups, the final product will be a poly (vinyl alcohol, acrylic acid) copolymer.

7 Claims, No Drawings

CONVERSION OF POLYVINYL ALCOHOL TO ACRYLIC ACID POLYMER

BACKGROUND OF THE INVENTION

1. Field of the Invention

This invention relates to a method for the production of acrylic acid polymers. More particularly, this invention relates to the conversion of polyvinyl alcohol to polyacrylic acid wherein the polyvinyl alcohol is reacted with formic acid to convert at least a portion of the hydroxyl groups to formate groups and wherein the formate-containing intermediate is brought into contact with activated carbon in the presence of carbon monoxide, a soluble compound of a group VIII metal catalyst, and an inorganic or organic halide promoter. When substantially all of the hydroxyl groups of the polyvinyl alcohol are converted to formate groups, the final product is polyacrylic acid. When less than all of the hydroxyl groups of the polyvinyl alcohol are converted to formate groups (e.g., by using less than an equimolar amount of formic acid in preparing the intermediate, the final product will be a poly (vinyl alcohol, acrylic acid) copolymer.

2. Prior Art

Wakamatsu et al. in U.S. Pat. No. 3,798,267 discloses the preparation of acetic acid by contacting methyl formate with activated carbon in the presence of a halide promoter and carbon monoxide.

Antoniades U.S. Pat. No. 4,194,056 also discloses a process for the preparation of acetic acid from methyl formate. In accordance with the Antoniades process, the methyl formate is brought into contact with a soluble rhodium salt catalyst in the presence of carbon monoxide and a halogen promoter.

Isogai U.S. Pat. No. 3,839,426 is more broadly directed to the preparation of organic carboxylic acids from formic acid esters, such as vinyl formate (Example 36) by contacting the formic acid ester with a group VIII or group IIb catalyst in the presence of carbon monoxide.

French Patent No. 2,030,118 discloses a process wherein carboxylic acids, especially acetic acid, are produced from methanol by reacting methanol and carbon monoxide over a solid activated carbon bed at a temperature of from 200° to about 500° C. and a pressure of about 100 to about 3000 psi (7–210 Kg/cm$^2$) using a halogen promoter which is either dispersed on the carbon bed or incorporated as a component of the catalyst system.

Copending coassigned U.S. patent application Ser. No. 478,830 filed Mar. 25, 1983 in the name of John M. Larkin and entitled "A Process for Alkanol Carbonylation to Carboxylic Acids Using the Novel Combination of Catalyst and Carbon Bed Components" discloses a process wherein an alkanol together with a halide promoter and a low concentration of a soluble metal catalyst is passed over a carbon bed in the presence of carbon monoxide.

Copending coassigned U.S. patent application Ser. No. 478,829 filed Mar. 25, 1983 in the name of John M. Larkin and Roger G. Duranleau and entitled "A Process for Producing Carboxylic Acids by Carbonylation of Alkanols Over a Carbon Catalyst" discloses a process wherein an alkanol and a halide promoter are passed over a carbon bed contained in a nickel or cobalt alloy reactor in the presence of carbon monoxide.

SUMMARY OF THE INVENTION

It has been surprisingly discovered in accordance with the present invention that polyvinyl alcohol can be substantially selectively converted to an acrylic acid polymer or copolymer by first reacting the polyvinyl alcohol with a desired predetermined amount of formic acid to form an intermediate reaction product of the formic acid with the hydroxyl groups of the polyvinyl alcohol and by bringing the intermediate into contact with a bed of activated carbon in the presence of carbon monoxide and a halide promoted group VIII soluble transition metal catalyst, optionally in the presence of a solvent. When substantially all of the hydroxyl groups are reacted with formic acid to form a polyvinyl formate intermediate, the final product will be a polyacrylic acid. When the intermediate contains both hydroxyl groups and formate groups, the final product will be a poly (vinyl alcohol, acrylic acid) copolymer.

DETAILED DESCRIPTION OF THE INVENTION

The starting materials for the present invention are polyvinyl alcohol, formic acid, carbon monoxide, activated carbon, a soluble compound of a group VIII transition metal, and a halide promoter.

PREPARATION OF THE VINYL FORMATE POLYMER INTERMEDIATE

The first step of the process of the present invention is the preparation of a vinyl formate polymer intermediate from polyvinyl alcohol and formic acid.

Any suitable polyvinyl alcohol may be used as a raw material such as, for example, a polyvinyl alcohol having a molecular weight of about 1,000 to about 200,000 and, more preferably, from about 8,000 to 130,000. Formic acid is added to the polyvinyl alcohol in an amount sufficient to provide for a desired poly (vinyl alcohol, acrylic acid). When the desired final product is poly acrylic acid, at least a mole equivalent amount of formic acid is used, based on the hydroxyl groups in the polyvinyl alcohol and, more preferably, a molar excess of formic acid is used, such as for example, from about 1.2 to about 10 mol equivalents of formic acid per mole equivalent of hydroxyl groups in the polyvinyl alcohol. When a vinyl alcohol, acrylic acid copolymer is the desired final product, correspondingly less formic acid should be used.

The reaction between the formic acid and polyvinyl alcohol proceeds slowly under ambient conditions. It can be accelerated by using a higher temperature (e.g., reflux temperature) and a suitable solvent such as chloroform, tetrahydrofuran, benzene, toluene, etc. Also, the reaction can be accelerated by removing by-product water as it is formed, for example, by azeotropic distillation.

CONVERSION OF THE VINYL FORMATE POLYMER INTERMEDIATE TO AN ACRYLIC ACID POLYMER

In accordance with the present invention, the vinyl formate polymer intermediate is catalytically reacted with carbon monoxide to convert the formate groups to carboxyl groups.

The catalysts that are suitable for use in the practice of the present invention are compounds of group VIII transition metals that are soluble in the vinyl formate polymer intermediate or an organic solvent solution thereof. The soluble metal catalyst may be chosen from a wide variety of organic and inorganic compounds, complexes, etc. as will be shown and illustrated below. It is only necessary that the catalyst precursor actually employed contain a group VIII transition metal in a soluble state.

The metal species used are selected from the group VIII transition metals. Effective metals include cobalt, ruthenium, iron, nickel, rhodium, palladium, osmium, iridium and platinum. The soluble group VIII metal catalyst may be added to the reaction mixture in the form of a carbonyl as in the case of, for example, triruthenium dodecacarbonyl, dicobalt octacarbonyl, iron pentacarbonyl, nickel tetracarbonyl, diiron nonacarbonyl, tetracobalt dodecacarbonyl, etc. Alternately, the group VIII metal may be added as the salt of a mineral acid as in the case of, for example, ruthenium trichloride, iron (II) iodide, iron (III) nitrate, cobalt (II) nitrate, cobalt (II) chloride, nickel (II) iodide, etc. or as the salt of a suitable organic carboxylic acid such as, for example, cobalt (II) acetate, cobalt (III) acetate, nickel (II) propionate, iron (II) naphthenate, etc. As additional examples, the metal may be added to the reaction mixture as a complex with a trisubstituted phosphorous compound or as a salt of an enolate. Representative examples include cobalt (III) 2,4-pentanedionate and dichlorotris (triphenylphosphine)ruthenium(II), etc.

Preferred group VIII soluble transition metal catalysts include carbonyls and halides. Among the particularly preferred are cobalt and nickel compounds such as dicobalt octacarbonyl, cobalt diiodide, nickel dichloride, etc.

Another effective method of adding small quantities of group VIII transition metals is to dissolve the group VIII metal in the reaction medium as for example by contacting the reactants and halide promoters with nickel or cobalt alloys. A particularly preferred method of introducing the soluble group VIII metal by this procedure is to use a reactor, pumps, or conduits constructed of nickel or cobalt alloys where the nickel or cobalt constitute from about 2% to about 98% of the metal content of the alloy. Commercial nickel stainless steel or Hastelloy alloys are especially preferred. Among these suitable alloys may be mentioned 316 Stainless Steel and Hastelloy C alloys.

The catalyst need not be present except as a minor constituent of the total reaction mixture. Thus, satisfactory results are obtainable when the group VIII metal constitutes from about 10 to about 1000 parts per million of the total reaction mixture, such as about 50 to about 150 ppm.

The alkyl halide promoter should be present in a larger concentration than the soluble metal, such as a concentration of about 1 to about 20 mol percent, based on the vinyl formate polymer intermediate. The halide promoting component of the catalyst system may be introduced into the reaction zone in liquid form or gaseous form or dissolved in a suitable solvent or reactant. Satisfactory halide promoters include alkyl halides containing 1 to 12 carbon atoms such as methyl iodide, ethyl iodide, 1-iodopropane, 2-iodobutane, 1-iodobutane, methyl bromide, ethyl bromide, dihalomethanes such as diiodomethane, inorganic halides such as alkali metal or group VIII metal halides (NaI, KBr, $NiI_2$, $CoI_2$, $RuI_3$, $RhI_3$, etc.), or acyl halides such as acetyl iodide, acetyl bromide, benzoyl iodide, etc. Especially preferred are alkyl iodides having from 1 to 3 carbon atoms such as methyl iodide, ethyl iodide, and the propyl iodides.

The carbon monoxide will normally be fed to the reaction zone in the form of a gas and may be used alone or in conjunction with up to 90% by volume of one or more other gases. These other gases may incude inert gases such as nitrogen, argon, neon, etc. Hydrogen may also be present, but a part of the carbon monoxide will tend to react with the hydrogen thus rendering that part ineffective for the purpose of the present invention.

The activated carbon bed over which the liquid feed stream is passed can be a fixed or fluidized bed and is prepared from a porous solid. The density range of the solid should be about 0.03–2.5 $cm^3$/gm. A preferred density range is 0.05–1.5 $cm^3$/g. A fixed carbon bed can be prepared from porous carbon by pyrolysis of amorphous carbon. Activated carbons of this type have surface areas of 200–2000 $m^2$/g. Carbons can be preformed of compacted granules, powders, or particles. Animal, vegetable or petroleum sources can be used.

The activated carbon bed can optionally be washed to remove metallic components which may be present from the organic sources used to prepare the carbon. If washed, the treatment consists of a HF solution or $HNO_3$ solution where the ratio is about 600 to about 1000 ml of $HNO_3$ per 500 g carbon and the $HNO_3$ concentration in water is from about 2%–30%. If HF is used, the concentration in water should be from about 10–55%. Washing time may be from 5 minutes to 24 hours. Further, the acid washed carbon should be washed with $H_2O$ to remove excess acid.

Suitable sources of activated carbon which can be used in the process of this invention include NORIT ® RB-1 or SORBONORIT ® B-3 activated carbon.

NORIT ® and SORBONORIT ® are registered trademarks of the American Norit Company. Another suitable activated carbon which may be used is CARBORUNDUM ® GAC-616G. CARBORUNDUM ® is a registered trademark of Kennecott Corporation. These activated carbons, prepared by the manufacturers according to procedures developed by them, are in the form of granules or pellets, and are described as generally having a surface area of 1000–1200 $m^2$/g. Methods of manufacturing activated carbon are listed in the book: *Activated Carbon, Manufacture and Regeneration* by A. Yehaskel, Noyes Data Corporation, Park Ridge, N.J., 1978.

The quantity of soluble transition metal catalyst employed in the instant invention is not critical and may vary over a wide range. Metal concentrations can range from less than 5 (e.g., 1) to greater than 1000 ppm, depending on the activity of the metal species. In general, my improved process is desirably conducted in the presence of a catalytically effective quantity of the active metal species, in conjunction with an alkyl halide promoter, and optionally in the presence of a solvent which gives the desired products in reasonable yields. The reaction proceeds when employing as little as about 0.0001 wt. %, and even lesser amounts of group VIII transition metal catalyst together with about 0.1–50 wt. % of a halide promoter, basis the total weight of the reaction mixture. The upper concentration is dictated by a variety of factors including catalyst cost, partial pressures of carbon monoxide, operating temperature, etc. A soluble group VIII transition metal catalyst concentration of from about 0.002 to about 0.02 wt. % metal in conjunction with an alkyl halide promoter concentration of from about 5 to about 15 mol percent based on the total mols of reaction mixture is generally desirable in the practice of this invention.

Although a solvent is not necessary for the reactions to occur, a solvent may be provided, for instance, to cause better solubility of promoters or to facilitate product separation. Suitable solvents include carboxylic acids such as acetic, propionic, butyric, and isobutyric acids, hydrocarbons such as cyclohexane, toluene, n-decane and the like, and ketones such as acetone, 2-butanone, or 4-methyl-2-pentanone. Other suitable solvents may include the organic chloride compounds such as chlorobenzene, chlorocyclohexane, 1-chlorohexane, etc. Preferred solvents are carboxylic acids such as propionic and butyric acids. When employing a solvent, it may be provided in concentrations of 5-80% and preferably in concentrations of 10-60% based on the weight of vinyl formate polymer intermediate.

A fluidized carbon bed or ebullient carbon bed is prepared by providing agitated contact of the activated carbon particles with the mixture of reactant liquids and gases as for example by suspending the carbon particles in the gas/liquid stream.

The reaction is also suitably conducted using a reactor, such as a jacketed reactor, containing a bed of activated carbon over which the other reactants are passed.

After passing through the reactor, the reactants and products may be separated from solvents by any suitable means such as vacuum distillation.

The temperature to be used in conducting the reaction of the present invention is a variable which is dependent upon other reaction parameters including pressure, the concentration and choice of the particular species of soluble group VIII metal catalysts, etc. In general, temperatures within the range of about 200° to about 400° C. are employed with superatmospheric pressures of carbon monoxide. A narrower temperature range of 240°-350° C. is preferred.

Superatmospheric pressures of 100 psi or greater may be used in practicing the process of this invention. A preferred operating range is from 500 psi to 4000 psi, although pressures above 4000 psi also provide useful yields of desired product.

In all these syntheses, the amount of carbon monoxide present in the reaction mixture should be from about 5% to about 50% on a mole equivalent basis of the amount of formate groups present. Preferably about 0.1 to about 0.3 moles of carbon monoxide per mole equivalent of vinyl formate polymer are used.

Residence time is another variable which may be used in controlling the course of the reaction.

When the reaction is conducted batch-wise in an autoclave, reaction times may suitably be within the range of about 1 to about 24 hours. When the reaction is conducted continuously, by passing the reactants over a bed of activated carbon, the liquid hourly feed rate may suitably be within the range of about 0.02 to about 1.0 w/hr/w.

SPECIFIC EXAMPLES

1. Preparation of Polyvinyl Formate

A mixture of 200 g of 14,000 mol. wt. polyvinyl alcohol (Aldrich) and 500 g of 95% formic acid was agitated together for two days. The polymer became rubbery. Chloroform (1.5 liters) and more $HCO_2H$ (200 g) was added, and the mixture was heated to reflux. A trap was provided to remove the upper layer of the collected overhead. After 24 hours, no more upper layer collected. The liquids were removed by distillation and vacuum dried at 85° C.; infrared analysis indicates the product to be largely polyvinyl formate with only a small amount of -OH groups unconverted.

2. Conversion of Polyvinyl Formate to Polyacrylic Acid

To 25 g of the polyvinyl formate from Example 1 in a glass liner, there was added 7.5 ml of iodomethane, 40.6 g of acetic acid, 0.055 g of $NiI_2 \cdot 6H_2O$, and 10.0 g of finely powdered SORBONORIT ® B-3 activated carbon. The liner was put in a stirred autoclave, purged with CO, and pressured with CO to 300 psig. The autoclave was heated to 250° C. and the contents were stirred at 240°-250° C. for 5¼ hours. Pressure varied between 1050 and 1260 psig. After cooling and venting a mixture of solids and liquid was obtained. The solids were identified by infrared as a mixture of polyacrylic acid and metal salts of polyacrylic acid.

The foregoing examples have been given by way of illustration only and are not intended as limitations on the scope of this invention, which is defined by the following appended claims.

What is claimed is:

1. A process for preparing an acrylic acid polymer which comprises the steps of reacting at least a portion of the hydroxyl groups of polyvinyl alcohol with formic acid to convert at least a portion of the hydroxyl groups of the polyvinyl alcohol to an intermediate containing formate groups and bringing the intermediate into contact with activated carbon in the presence of carbon monoxide, a soluble group VIII transition metal catalyst and an alkyl halide promoter to thereby provide a reaction product comprising a polymer wherein the formate groups of the said intermediate are converted to carboxyl groups to thereby provide said acrylic acid polymer, said catalyst being soluble in said intermediate or an organic solvent solution of said intermediate.

2. A process as in claim 1, wherein the intermediate is brought into contact with the activated carbon at a temperature within the range of about 200° to about 360° C. and a pressure within the range of about 1500 to about 2100 psig.

3. A process as in claim 2, wherein the polyvinyl alcohol is reacted with a molar excess of formic acid, based on the hydroxyl groups in the polyvinyl alcohol, to thereby provide a polyvinyl formate intermediate product and whereby the final product will comprise poly acrylic acid.

4. A process as in claim 3, wherein polyvinyl formate is brought into contact with the activated carbon in solvent solution.

5. A process which comprises bringing polyvinyl formate into contact with activated carbon having a density of about 0.03 to about 2.5 $cm^3$ per gram and a surface area of about 200 to about 2,000 $m^2$ per gram in the presence of carbon monoxide, about 10 to about 1,000 parts per million, based on said polyvinyl formate, of a soluble group VIII transition metal catalyst and about 1 to 20 mol %, based on said polyvinyl formate, of a $C_1$ to $C_{12}$ alkyl iodide promoter under reaction conditions including a temperature in the range of about 200° C. to about 400° C. and a pressure within the range of about 500 to about 4000 psig. to thereby provide a reaction product comprising polyacrylic acid, said catalyst being soluble in said polyvinyl formate or an organic solvent solution of said polyvinyl formate.

6. A process as in claim 5, wherein the halide promoter is iodomethane and the group VIII transition metal catalyst is a nickel catalyst.

7. A process as in claim 6, wherein the nickel catalyst is nickel iodide.

* * * * *